A. E. CHERRY.
INCUBATOR.
APPLICATION FILED JUNE 23, 1908.
915,412.
Patented Mar. 16, 1909.
2 SHEETS—SHEET 1.
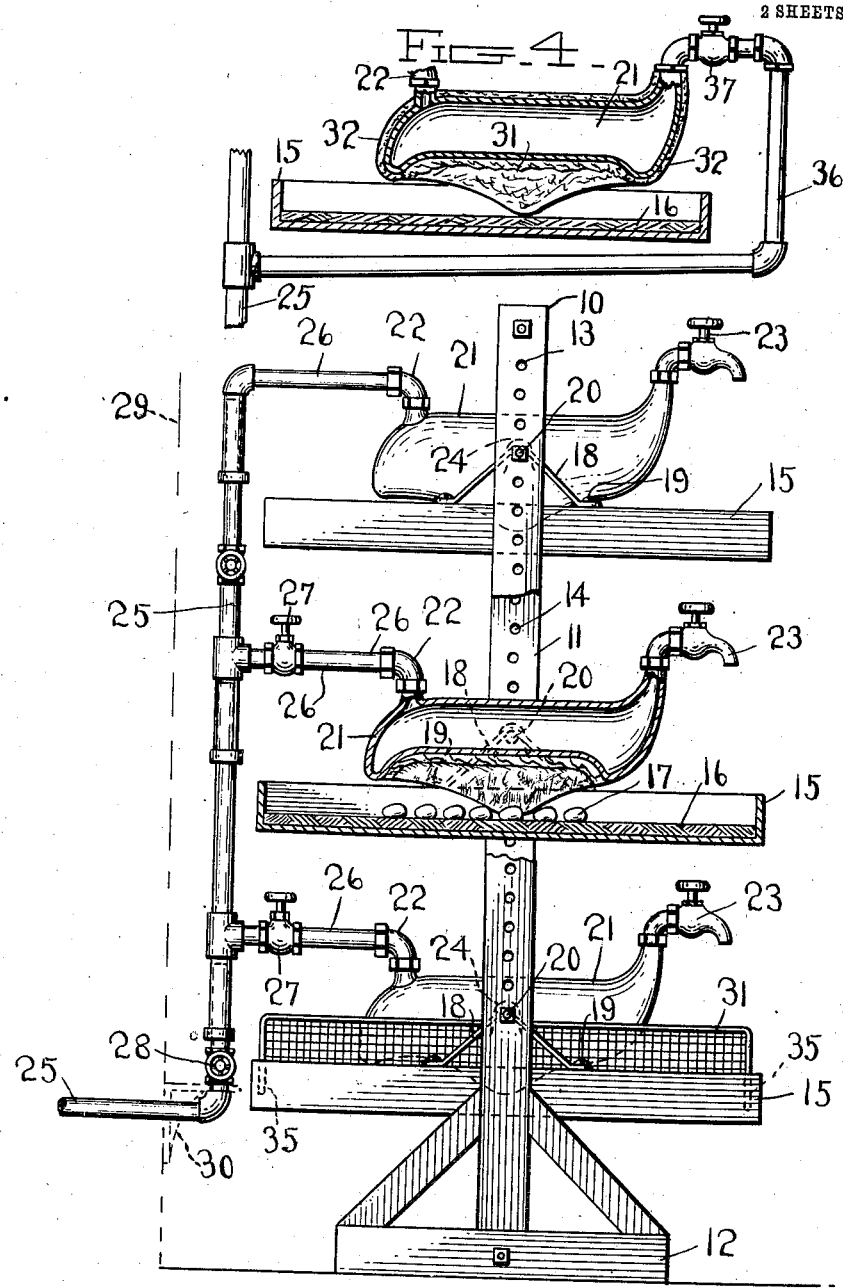
Witnesses
L. B. James
C. N. Woodward
Inventor
Addie E. Cherry
By Chandler & Chandler
Attorneys A. E. CHERRY.
INCUBATOR.
APPLICATION FILED JUNE 23, 1908.
915,412.
Patented Mar. 16, 1909.
2 SHEETS—SHEET 2.
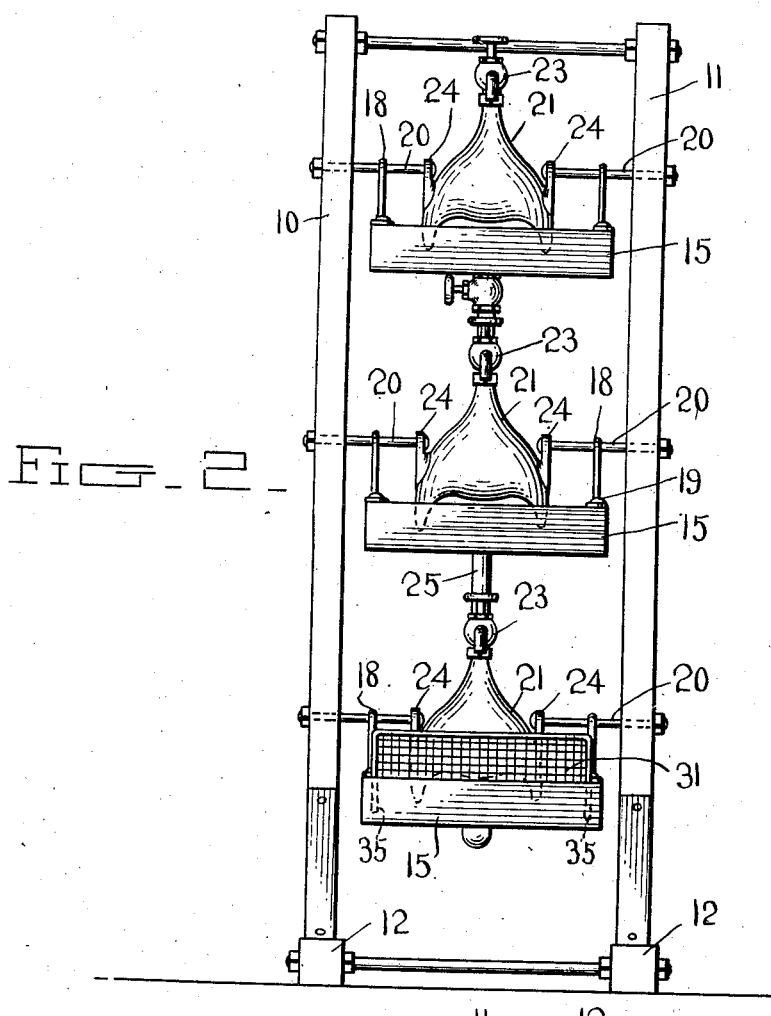
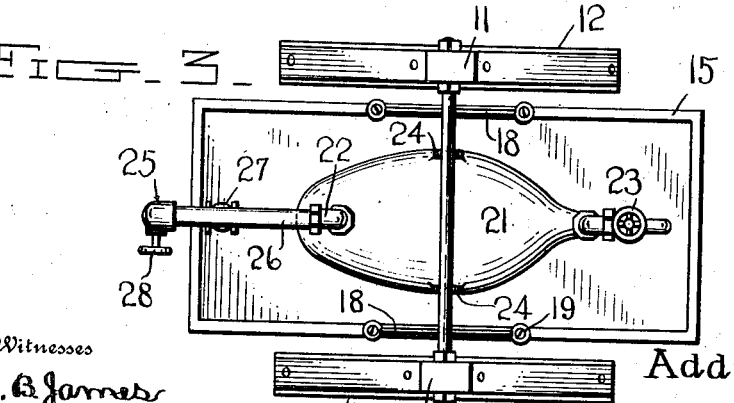
Witnesses
L. B. James
C. H. Woodward
Inventor
Addie E. Cherry
By Chandler & Chandler
Attorneys

UNITED STATES PATENT OFFICE.

ADDIE ELEN CHERRY, OF BELLWOOD, PENNSYLVANIA.

INCUBATOR.

No. 915,412.   Specification of Letters Patent.   Patented March 16, 1909.

Application filed June 23, 1908. Serial No. 439,965.

*To all whom it may concern:*

Be it known that I, ADDIE ELEN CHERRY, a citizen of the United States, residing at Bellwood, in the county of Blair, State of Pennsylvania, have invented certain new and useful Improvements in Incubators; and I do hereby declare the following to be a full, clear, and exact description of the invention, such as will enable others skilled in the art to which it appertains to make and use the same.

This invention relates to incubator devices of the class described wherein an imitation of a brooding hen is employed, and has for one of its objects to simplify and improve the construction and increase the efficiency and utility of devices of this character.

Another object of the invention is to provide a simply constructed device comprising an egg supporting receptacle and an artificially brooding element and imparting thereto the necessary warmth to produce the incubation and likewise to provide means for the care of the chicks after hatching.

Another object of the invention is to provide a simply constructed device wherein the egg supporting portion and the brooding portions may be adjusted and likewise wherein means are provided for the inspection and care of the eggs during the hatching period.

With these and other objects in view the invention consists in one or more receptacles for the eggs adjustably supported, a covering for the eggs and adapted to be artificially heated and so arranged that the eggs may be inspected and cared for without disturbing the heating appliances.

The invention further consists in a supporting framework carrying a plurality of egg supporting receptacles, a corresponding plurality of egg warming appliances, the egg and warming appliances adapted to be adjusted upon the frame.

The invention further consists in certain novel features of construction as hereafter shown and described and then specifically pointed out in the claims, and in the drawings illustrating the preferred embodiment of the invention.

Figure 1 is a side elevation partly in section of the improved apparatus. Fig. 2 is a front view of the same. Fig. 3 is a top plan view. Fig. 4 is a sectional detail view illustrating modification in the construction, and also illustrating the manner of applying the non-conductive covering to the heating shell.

The improved apparatus comprises a supporting frame having spaced vertical members 10—11 and a supporting base structure 12. The members 10—11 are provided respectively with spaced transverse apertures 13—14 to provide means for detachably supporting the egg receptacles and warming devices as hereafter explained.

The egg supporting elements comprise rectangular receptacles 15 preferably of wood and having deposited therein earth, sod, sand, or the like, as indicated at 16, upon which the eggs indicated at 17, rest. Any required number of the receptacles 15 may be employed, according to the lengths of the framework members 10—11, but for the purpose of illustration three of the receptacles are shown. Each receptacle is suspended from the frame members 10—11 by hangers 18 detachably secured as by screws 19 to the receptacles 15 and supported by bolts 20 from the frame members 10—11.

The suspending devices 18 are preferably formed upwardly converging or in bail like form and are suspended from the bolts 20, so that the receptacles 15 may be readily tilted to a limited extent to enable the eggs to be inspected or cared for, as hereafter explained.

The warming element comprises an oblong shell or hollow casing 21 concaved on the under surface, the casings being preferably constructed from suitable metal, preferably copper, and are lined within their hollow under surfaces with layers of cotton, wool, or the like represented at 30, while the casings are likewise covered upon the outer faces with a suitable non-conducting fabric represented at 33. The cotton lining may likewise be further increased in thickness with feathers as at 34 attached in any suitable manner by sewing or other means or by suitable cement which will not readily yield to the influence of heat.

The casings 21 are of less length than the receptacles 15 so that spaces are left in the receptacles at the ends for the gathering of the young chicks after hatching, as hereafter explained. The casings 21 will conform to some extent to the natural hen, and the concaved under side will likewise be formed to represent as far as possible the conditions present in the body of the natural hen, as to the feathers and other protecting elements. The casings 21 are designed to receive the heating medium, preferably hot water, and each will be provided with an intake pipe 22 at one end and a draw off valve 23 at the other end, the pipes 22 adapted to receive the supply of hot water and the valves 23 providing for a constant flow through the casings to thus secure the necessary continuous uniform heat, as hereafter more fully explained. The casings 21 are formed with ears 24 through which the bolts 20 pass, the same bolts 20 by which the receptacles 15 are suspended being thus utilized to suspend the hollow casings, and by providing the members 10—11 with the spaced apertures 13—14 each pair of the receptacles and the casings may be adjusted relative to each other to any required extent within the range of the spaced apertures, as will be obvious. By this means the space occupied by the receptacles and casings may be controlled, as required.

Any required means may be employed for heating the water which is conducted into the casings 21 and as the hot water generator forms no part of the present invention it is not deemed necessary to illustrate it. The hot water is supplied through a pipe 25 from any suitable source of supply and is fed by branch pipes 26 to the various receptacles 21, the branches each provided with a controlling valve 27 while the main pipe 25 is likewise provided with controlling valves 28, so that the receptacles may be independently supplied with the heating medium, or any individual receptacle cut off without interfering with the others if required.

The pipe 25 and its branches may be supported in any suitable manner, and for the purpose of illustration the pipe 25 is shown erected near a wall 29 from which brackets 30 extend to support the piping, but it is to be understood that it is not desired to limit the invention to any means for arranging or supporting hot supply pipes, as they will be varied as required to adapt the device to the locality where it is erected.

If it is desired to inspect the eggs or to care for them during the hatching process, the receptacles 15 may be tilted slightly by employing a limited degree of force to swing them upon the bolts 20, care being taken to hold them firmly while thus manipulating them to prevent accident. The casings 15 may thus be tilted to an extent sufficient to enable addled or broken eggs or other material to be removed, and likewise to enable the eggs and chicks to be cared for when required. By forming the receptacles 15 of greater length than the casings 21, spaces are left at the ends of the receptacles for the young chicks to move about before they are removed to the brooders.

The improved device is simple in construction, can be extended to any required extent by increasing the sizes of the frames 10—11 and supplying an additional number of the receptacles 15 and casings 21, as will be obvious. The receptacles 21 are provided with shields 31 of "chicken wire" to be detachably connected to the upper edges of the receptacles 15 by inserting their ends as at 35 in the same to prevent the escape of the chicks or to prevent them from falling from the receptacles. These shields 31 will be readily detachable so that they can be supplied as soon as the chicks are hatched and will not necessarily be arranged upon the receptacles at an earlier date. The casings 21 will be of metal, as light as possible consistent with the strains to which they will be subjected, the thinness of the metal increasing the radiating action of the heating medium.

If required the drawoff valves 23 will be replaced by return pipes 36 as represented in Fig. 4, and a controlling valve 37 arranged therein, but this will not be a material departure from the invention, as the same results would be obtained, namely to secure the necessary circulation of hot water throughout the casings 21, and thus maintain the temperature at the required degree.

What is claimed, is:—

1. In an incubating apparatus, a receptacle for the eggs, a heat imparting element located above the receptacle and comprising a hollow casing having a concave under surface and adapted to receive the heating medium, and means for pivotally supporting the receptacle whereby it may be tilted independently of the heat imparting element.

2. In an incubating apparatus, a supporting frame, a plurality of egg receptacles upon said frame, a heating element for each receptacle and located above the same and comprising a hollow casing having a concave under surface and of less length than the receptacle, and means for pivotally supporting the receptacle whereby it may be tilted independently of the heat imparting element.

3. In an incubating apparatus, a receptacle for the eggs, a heat imparting element located above the receptacle and comprising a hollow casing having a concave under surface and adapted to receive the heating medium and of less length than the receptacle, whereby areas for the chicks are provided beyond the casing, and means for pivotally supporting the receptacle whereby it may be tilted independently of the heat imparting element.

4. In an incubating apparatus, a supporting frame having spaced transverse apertures, a plurality of egg receptacles, pins adapted to be disposed in said apertures, bails connected to said receptacles and engaging over said pins whereby the receptacles may be tilted to render the contents accessible, and a heating device for each receptacle and located above the same and comprising a hollow casing having a concave under surface and of less length than the receptacle.

5. In an incubating apparatus, a heat imparting element comprising a hollow casing having a concaved under surface and adapted to receive the heating medium, a receptacle for the eggs of greater length than the casing and disposed below the same, and a guard device formed of foraminous material and detachably connected to said receptacle and extending above the same.

6. In an incubating apparatus, a heat imparting element comprising a hollow casing having a concave under surface and adapted to receive the heating medium, a lining of protecting fabric material within the concaved portion, a receptacle for the eggs located beneath the casing and of greater length than the same, and means for pivotally supporting the receptacle whereby it may be tilted independently of the heat imparting element.

In testimony whereof, I affix my signature, in presence of two witnesses.

ADDIE ELEN CHERRY.

Witnesses:
J. A. MILLER,
J. T. CRISWELL.